H. CASLER.
MEANS FOR IMPROVING THE DEFINITION OF PHOTOGRAPHIC LENSES.
APPLICATION FILED MAR. 31, 1909.
1,082,678.
Patented Dec. 30, 1913.
2 SHEETS—SHEET 1.
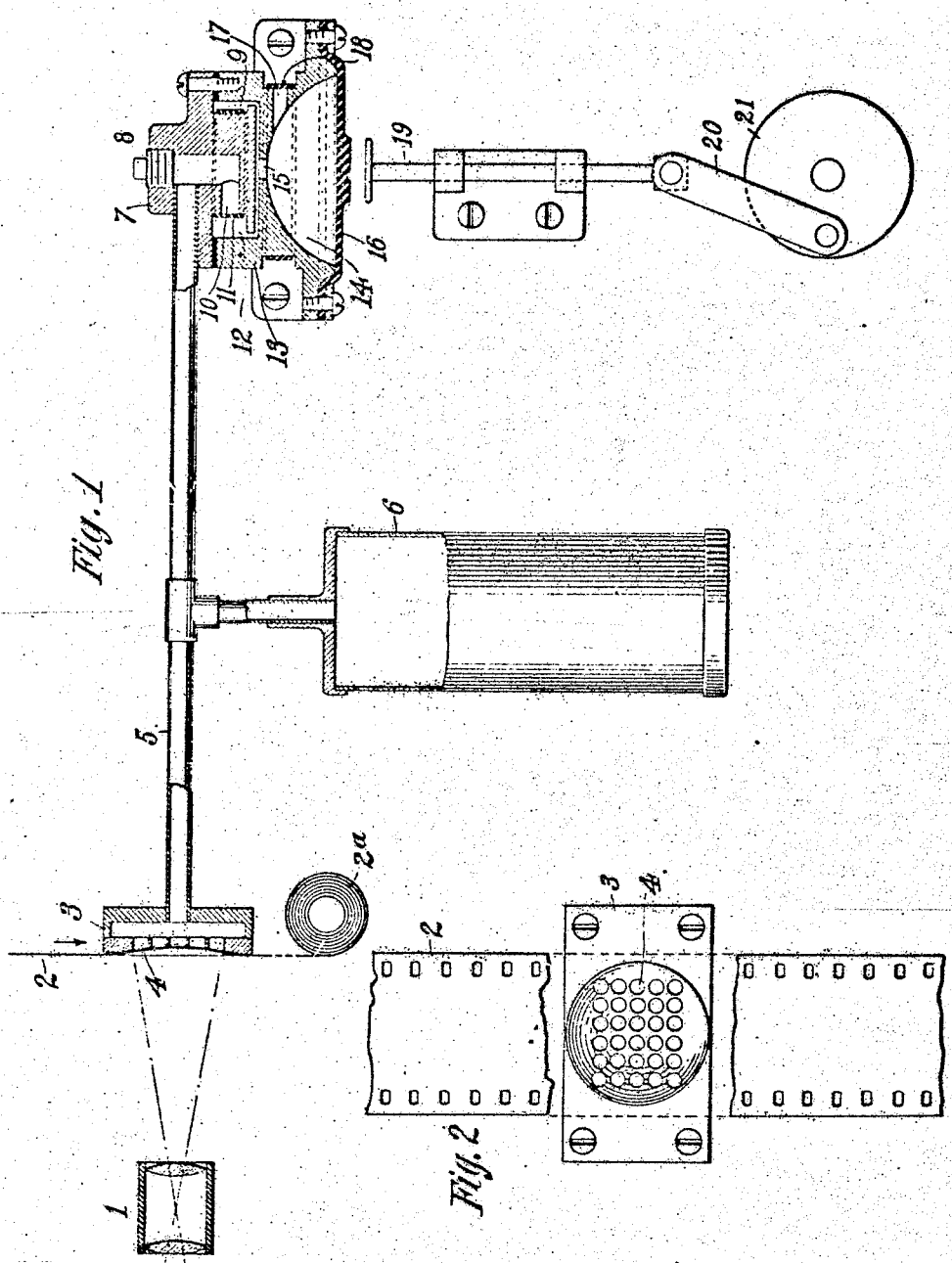
H. Casler, Inventor H. CASLER.
MEANS FOR IMPROVING THE DEFINITION OF PHOTOGRAPHIC LENSES.
APPLICATION FILED MAR. 31, 1909.
1,082,678.
Patented Dec. 30, 1913.
2 SHEETS—SHEET 2.
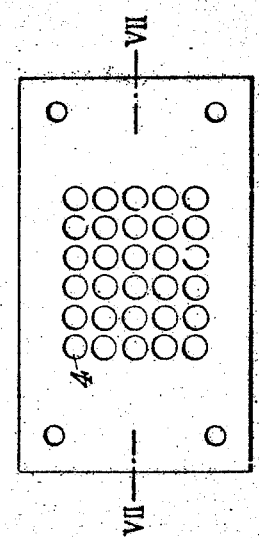
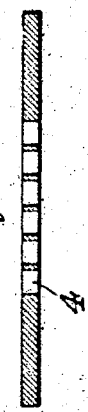
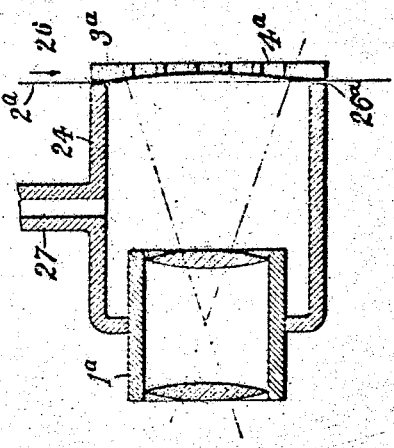
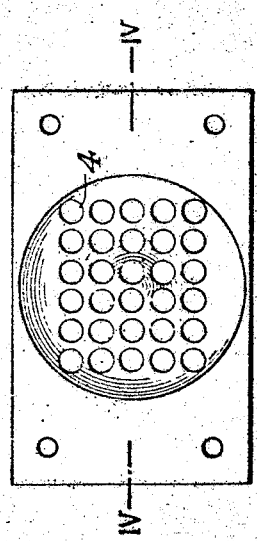
Witnesses:
A. E. Mahan
S. S. Dunham
H. Casler, Inventor
By his Attorneys
Kerr, Page, Cooper & Hayward

UNITED STATES PATENT OFFICE.

HERMAN CASLER, OF CANASTOTA, NEW YORK.

MEANS FOR IMPROVING THE DEFINITION OF PHOTOGRAPHIC LENSES.

1,082,678.  Specification of Letters Patent.  Patented Dec. 30, 1913.

Application filed March 31, 1909. Serial No. 487,037.

*To all whom it may concern:*

Be it known that I, HERMAN CASLER, a citizen of the United States, residing at Canastota, in the county of Madison and State of New York, have invented certain new and useful Improvements in Means for Improving the Definition of Photographic Lenses, of which the following is a full, clear, and exact description.

This invention relates to photographic cameras, more particularly those in which the negative is made on a flexible film in contradistinction to a rigid plate, and the invention has been devised with special reference to so-called moving picture cameras, for taking pictures of successive phases of an object or objects in motion. Such negatives are, for practical reasons, quite small, but in exhibiting the pictures by projection on a screen they are magnified many fold, and it is evident that any defects in the original negative will be correspondingly magnified and made apparent to the spectators. Such defects may arise from various causes, but the most fruitful source of trouble, other conditions being equal, lies in the spherical aberration of the photographic lens by which the image is thrown upon the sensitive film. The mathematical theory of aplanatic lenses, that is, lenses free from spherical aberration, so that all light rays are brought to focus at the same plane, is comparatively simple and is well understood, and in the case of simple lenses for use as reading glasses, magnifying glasses, etc., is not specially difficult of application in practice. But where chromatic aberration is also to be corrected, involving two or more lenses and hence the figuring of at least twice as many optical surfaces as in the case of a single lens, complicating factors are introduced and the practical problem becomes one of a far different order. The figuring of the lenses in an achromatic-aplanatic combination requires, for the production of the best results, the highest degree of skill, particularly in the case of lenses of comparatively short focal length, such as are used in moving picture photography. In short it is, I believe, a fact that seldom if ever is a short-focus achromatic lens produced in which the correction for spherical aberration is sensibly perfect over the entire image or "field," especially when the lens is used with full aperture. The use of stops improves the performance of the lens as regards definition but effects a corresponding reduction of the quantity of light thrown upon the sensitized surface, and thereby reduces the "speed" of the lens.

It is usually found that lenses which exhibit spherical aberration bring the light rays to focus not at a plane, but at a surface which is concave toward the lens; or at a surface made up of concentric rings at very slightly different distances from the lens, in which latter case the lens is said to suffer from "zonal errors." In either case when one part of the image is sharply focused on the film or plate other parts are hazy or blurred to a greater or less degree. In a small negative itself or a direct print therefrom, say an inch and a half in its longest dimension, this slight haziness or blurring usually can hardly be detected, if at all; but when the picture is "enlarged," by projection upon a sensitized paper or other surface for photographic printing, or by projection on a screen for direct observation, the defects become glaringly apparent. This is particularly troublesome in moving pictures, in which, as before stated, the original picture is very small and the projected image very large.

My present invention has been devised with a view to overcoming the defects referred to, not by sensibly perfect correction of the lens itself, but by the construction of the camera in which the lens is used; and to this end the invention consists, broadly stated, in the provision of means whereby the flexible film used for making the negative is made to conform more accurately to the focal surface of the lens, with consequent improvement in the definition of the image.

In carrying out my invention in the preferred manner a backing or back-plate is provided against which the film rests during the period of exposure to the light rays. The front surface of this back-plate, that is, the surface which is toward the lens, is figured as nearly as practicable in conformity to the focal surface of the lens; which surface can be ascertained accurately enough without great difficulty, as for example by noting the definition at different parts of the image at different distances from the lens. The sensitive flexible film is then caused, by the application of pneumatic pressure on the forward side, to conform to the surface of the back plate, with the results that the film is brought into closer conformity to the focal surface of the lens. This mode of applying the invention is illustrated, somewhat diagrammatically, in the annexed drawings, and referring now thereto, Figure 1 is a sectional view showing the back-plate and the preferred mechanism for producing the desired difference in pressure, and showing also, in diagram, a lens-system for projecting an image upon a film arranged in front of the back-plate. Fig. 2 is a front view of the back-plate shown in Fig. 1, with the film broken away from the front thereof. Fig. 3 is a front view of a back-plate for use with a lens exhibiting zonal errors, in which the center of the plate is convex. Fig. 4 is a section on line IV—IV of Fig. 3. Fig. 5 is a sectional view of a back-plate for similar use, but in which the center of the plate is concave. Fig. 6 is a front view of a plane back-plate for use with a lens in which the spherical aberration is practically inappreciable, for the purpose of obviating buckling or similar distortion of the film. Fig. 7 is a section on line VII—VII of Fig. 6. Fig. 8 is a sectional view of a modified means for producing the pneumatic pressure on the film.

The objective 1 is shown diagrammatically in Fig. 1 to indicate any lens or system of lenses for projecting an optical image upon a sensitive flexible film, as for example the moving picture negative film 2. The film is wound upon a roll or spool 2ª representing diagrammatically any suitable mechanism or devices for passing the film through the field of the lens. At the rear of the lens, slightly back of the focal surface or field thereof to allow for the thickness of the film, is the back-plate or film-support 3. The lens 1 is assumed to have a concave instead of a plane field or focal surface and I therefore make the back-plate (of Fig. 1) also concave. If the focal surface or field is convex or otherwise shaped the back-plate is of course figured correspondingly. For instance in Figs. 3, 4 and 5 are shown a back-plate indicative of those for use with a lens having zonal errors. In the plate shown in Figs. 3 and 4 the field is convex at the center and edges, and in Fig. 5 it is concave at such points. In these figures the divergence of the said film support from a true plane is exaggerated, so as to be seen more easily. In practice the concavity or convexity, as the case may be, need be only slight, in many cases hardly appreciable, and since the film, when relatively large areas are considered, is very flexible, no difficulty is experienced in that respect in making the film conform closely to the figure of the back-plate or support. I consider the use of pneumatic pressure, properly applied to the film, to be the best mode of producing the desired conformity of the film to the focal surface, and this pressure may be produced by exhausting the air back of the film, in which case the effective pressure is that of the atmosphere in front of the film, or by compressing the air in front of the film.

Convenient apparatus for practising the former method is illustrated in Fig. 1, and will now be described.

The film-support or back-plate is hollow or chambered and in its front has a suitable number of apertures 4, preferably covering substantially the entire area occupied by the focal image. In communication with the interior of the film-support is a pipe or tube 5, communicating also with an air-tight hollow cylinder or auxiliary vacuum chamber 6, and connected to the top 7 of a suitable air-pump 8. The top or cap 7 has a depending portion 9, in the side of which opens the passage 10 which communicates with the pipe 5. The said depending portion is encircled by an elastic band 11 of suitable material, (which serves as a valve in the manner hereinafter described), and is inclosed in a chamber 12 formed in the upper part of the body 13. In the lower part of the body is a chamber 14, preferably dome-shaped or hemispherical, as shown, closed by a resilient diaphragm 16, and communicating with the upper chamber through an aperture 15. Extending from the chamber 14 to the exterior of the body is a passage 17, closed on the outside by an elastic band-valve 18 encircling said body. Arranged perpendicularly and adjacent to the diaphragm is a reciprocating plunger 19, actuated by a link 20 connected to a crank disk 21, which latter is rotated by any suitable mechanism, not shown, as by connection with the devices usually employed to draw the film through the field of the lens.

At each upward movement the plunger strikes the diaphragm and forcing it inward causes a portion of the air in the lower chamber to be expelled through the aperture 17. On retraction of the plunger the elastic diaphragm is returned to normal position by its own resiliency, thereby drawing air from the chambered back-plate or film-support 3 through the tube 5 and passage 10, past the outwardly-movable band-valve 11 and through the aperture 15, into the chamber 14. The vacuum thus produced in the film-support causes the atmosphere in front of the film to press the same back against the support and hence into substantial conformity to the focal surface of the lens. The exposure having been made the light is intercepted by a suitable shutter, not shown, and the film is drawn for a new exposure, all the time being held in close contact with the support or back-plate. The vacuum is maintained by the continued operation of the air pump. In this way, by moving the film intermittently through the field of the lens the entire strip or band is exposed at the proper points.

As before stated, the film is very flexible when considerable area thereof is acted on by the flexing pressure, and hence the force required to produce the desired conformity to the figure of the back-plate is comparatively slight. On the other hand, small areas of the film are practically unyielding when only small forces are applied, and hence, by properly proportioning the apertures 4 the desired flexure of the film with respect to the back-plate as a whole can easily be produced without sensible distortion by the individual apertures.

The capacity of the air pump is preferably made greater than just sufficient to produce the necessary flexing pressure and compensate for leakage of air around the edges of the back-plate into the interior of the same, and advantage is taken of this excess capacity to provide an auxiliary vacuum for the purpose of taking care of any abnormal leakage of air into the chambered film-support, such as might be caused by a splice in the film, or a tear, passing over the support. The desired result can be attained, for example, by making the chambers in the air pump rather large, but it is desirable to keep the pump as compact as possible, and I therefore provide the chamber 6 for the purpose mentioned. This chamber being in communication with the film-support air is exhausted from the two simultaneously, and eventually the maximum degree of vacuum which the pump is capable of producing is produced in the back-plate and in the said auxiliary chamber. This degree of vacuum is no higher than would be produced in the system without the cylinder 6; but since the quantity of air exhausted from the system is greater when the said cylinder is employed it is evident that considerably more air can leak into the back-plate or film-support without material effect upon the vacuum than would be possible if the auxiliary chamber were not used. Abnormal leakage of air can therefore occur, as by reason of a splice or tear in the film, without materially affecting the operation of the system if at all. Moreover, in being thus made to conform to the surface of the film-support, any irregularities in the film are eliminated, such, for example, as those due to local stretching or shrinking of one part of the film more than another, producing bulges or hollows, etc. This feature of the invention is of marked advantage, and may be availed of not only where correction for aberration in the lens is desired, but also in cases where the field of the lens is sensibly plane. In such cases the back-plate or film-support is flat, as in Figs. 6 and 7, for instance, and hence the effect of the support is to make the film itself flat, eliminating local inequalities which otherwise might cause the image to be blurred or distorted.

As previously stated, the desired pneumatic pressure may be applied by creating a vacuum behind the film, as already described, or by actually compressing the air in front of the film. A simple construction for the latter purpose is illustrated in Fig. 8. In this figure the film-support $3^a$, provided with perforations or apertures $4^a$, forms the back of a chamber 24, in the front wall of which the lens, $1^a$, is mounted. The film, $2^a$, passes in front of the support through narrow slots 26, $26^a$, in the top and bottom of the chamber, and the chamber itself is connected by a tube 27 to a suitable air compressor, not shown. Air is thus compressed in the chamber, with the result that the film is forced back against the support into conformity with the figure thereof. Of course there will be more or less escape of air through the slots 26, $26^a$, but in no greater amount than can easily be taken care of by the compressor.

I desire it to be understood that the use of the expression "irregular focal surface" wherever it occurs, whether in the description or in the claims, is so regarded as to include any surface other than the ordinary plane surface.

The invention has been found to possess marked utility in practice, and while the devices herein shown and described are believed to be the most convenient for the purpose in hand it is to be understood that the invention is not limited thereto but is capable of embodiment in various forms without departure from its proper scope as defined by the appended claims.

What I claim is:

1. In a photographic camera, the combination of a photographic lens, a film-support figured in correspondence with the focal surface of the photographic lens, and means for effecting a difference in pressure on the opposite sides of the photographic film to cause the same to conform to the figure of the said support, as set forth.

2. In a photographic camera, the combination of a photographic lens exhibiting an irregular focal surface, a film-support coextensive with the field and figured in correspondence with the focal surface of the photographic lens, said camera having means for effecting a difference in pressure on the opposite sides of the photographic film over substantially the entire area of the focal image for causing the film to conform to the figure of the said support, as set forth.

3. In a photographic camera, the combination of a photographic lens, a film-support having its front surface figured in correspondence with the focal surface of the photographic lens and having apertures open at such figured surface, and means for producing greater air-pressure in front of said support than behind the same, whereby a flexible photographic film in front of the support will be pressed into conformity with the said figured surface of the support, as set forth.

4. In a photographic camera, the combination of a photographic lens, a film-support having its front surface figured in correspondence with the focal surface of the photographic lens, and means for exhausting air from behind a photographic film positioned in front of said support, whereby the pressure of the air in front of the film will cause the same to conform to the said figured surface of the film-support, as set forth.

5. In a photographic camera, the combination of a photographic lens, a chambered film-support having its front surface figured in correspondence with the focal surface of the photographic lens and having apertures extending from said figured surface to the interior of the support, and means for producing a partial vacuum in the interior of said support, as set forth.

6. In a photographic camera, the combination of a photographic lens, a chambered film-support having its front surface figured in correspondence with the focal surface of the photographic lens and having apertures extending from the figured surface to the interior, means for creating a partial vacuum in the interior of said support, and an auxiliary vacuum-chamber in communication with said support, as set forth.

7. In a photographic camera, the combination with a photographic lens imperfectly corrected for spherical aberration, of a film-support having its front surface figured in correspondence with the focal surface of the lens, and pneumatic means for effecting a difference in pressure on the opposite sides of a flexible photographic film to cause the same to conform with the said figured surface of the support, as set forth.

8. In a photographic camera for taking pictures of successive phases of an object in motion, the combination with the photographic lens exhibiting an irregular focal surface, and means for passing the photographic film through the field of said lens, of a film-support having its front surface coextensive with the field and figured in correspondence with the focal surface of the lens, and means for effecting a difference in pressure on opposite sides of the film for causing the film to conform to the front surface of the said support, as set forth.

9. In a photographic camera for taking pictures of successive phases of a moving object, the combination with the photographic lens, and means for passing the photographic film through the field of the lens, of a film-support having its front surface figured in correspondence with the focal surface of the said lens, and means for effecting a difference in pressure on opposite sides of the film for pneumatically pressing the same into conformity with the front surface of the said support, as set forth.

10. In a photographic camera, the combination of a photographic lens, a chambered film support having its front surface figured in correspondence with the focal surface of the photographic lens and having apertures covering substantially the entire area of the focal image and extending from the said front surface to the interior, an air-pump connected with the interior of the said support, and an auxiliary vacuum-chamber in communication with the interior of the said support, as set forth.

11. In a photographic camera, the combination of a chambered film support having an apertured front wall, an operating air pump connected with the interior of said support, and an auxiliary vacuum chamber in communication with the interior of the said support, as set forth.

In testimony whereof I affix my signature in the presence of two subscribing witnesses.

HERMAN CASLER.

Witnesses:
MARION J. SHAW,
CHARLES W. JONES.